United States Patent [19]
Mahant-Shetti et al.

[11] Patent Number: 6,144,768
[45] Date of Patent: *Nov. 7, 2000

[54] METHOD OF DECODING IMAGE DATA

[75] Inventors: Shivaling S. Mahant-Shetti, Garland, Tex.; Whoi Yul Kim, Seoul, Rep. of Korea

[73] Assignee: Texas Instruments Incorporated, Dallas, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/845,533

[22] Filed: Apr. 25, 1997

[51] Int. Cl.[7] ............................................. G06K 9/36
[52] U.S. Cl. .................... 382/233; 382/232; 382/248; 382/251
[58] Field of Search .................... 382/233, 250, 382/248, 239, 245; 358/426, 427, 432, 433; 348/405, 419

[56] References Cited

U.S. PATENT DOCUMENTS

| | | | |
|---|---|---|---|
| 5,121,216 | 6/1992 | Chen et al. | 358/261.3 |
| 5,384,849 | 1/1995 | Jeong | 382/248 |
| 5,495,538 | 2/1996 | Fan | 382/233 |
| 5,519,503 | 5/1996 | Ohki | 358/335 |
| 5,686,683 | 11/1997 | Freed | 84/625 |

FOREIGN PATENT DOCUMENTS

WO 93/21731  10/1993  Japan ........................ H04N 5/93

OTHER PUBLICATIONS

Approximation of Curves; pp. 275–279.

*Primary Examiner*—Jose L. Couso
*Assistant Examiner*—Duy M. Dang
*Attorney, Agent, or Firm*—Carlton H. Hoel; W. James Brady; Frederick J. Telecky, Jr.

[57] ABSTRACT

An image encoding/decoding system (10) includes an encoder section (12) and a decoder section (14). The encoder section (12) includes an image detector (15), a transform processor (16), a quantizer (18), a zig-zag process memory (20), and a run/variable length encoder (22). The decoder section includes a variable/run length decoder (24), a dequantizer (26), a zig-zag deprocess memory (28), and an inverse transform processor (30). The inverse transform processor (30) within the decoder section (14) uses basis functions (58) based on a discrete articulated trapezoid transform for ease of realizability in decoding image data. The discrete articulated trapezoid transform may also be used by the transform processor (16) within the encoder section (12) for the encoding of detected images.

13 Claims, 2 Drawing Sheets

METHOD OF DECODING IMAGE DATA

TECHNICAL FIELD OF THE INVENTION

The present invention relates in general to image processing and more particularly to a method of decoding image data.

BACKGROUND OF THE INVENTION

Presently, Motion Picture Experts Group (MPEG) or Joint Photographic Experts Group (JPEG) images are decoded using inverse discrete cosine transforms. Inverse discrete cosine transforms consist of using basis is functions that are cosines with discretizations at multiples of 11.25 degrees multiplying discrete cosine transform coefficients. This form of decoding requires real number representations and multipliers to perform the multiplication. Computational requirements for MPEG or JPEG coding and decoding are performed in parallel. The area and power exhausted by the multipliers limits the amount of parallelism that can be performed. Multipliers use up valuable space on a semiconductor die, increase design costs, and suffer in the area of speed especially as image size increases. Therefore, it is desirable to have a low cost, faster solution to perform MPEG or JPEG image decoding.

SUMMARY OF THE INVENTION

From the foregoing, it may be appreciated that a need has arisen for a method of image decoding that overcomes the problems found in multiplier based decoders. In accordance with the present invention, a method of decoding image data is provided that substantially eliminates or reduces disadvantages and problems associated with conventional decoding techniques.

The present invention provides various technical advantages over conventional image decoding techniques. For example, one technical advantage is to use a discrete articulated trapezoidal transform in place of a discrete cosine transform. Another technical advantage is to perform integer realizable computations. Yet another technical advantage is to use chained additions in place of the multipliers of conventional techniques. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
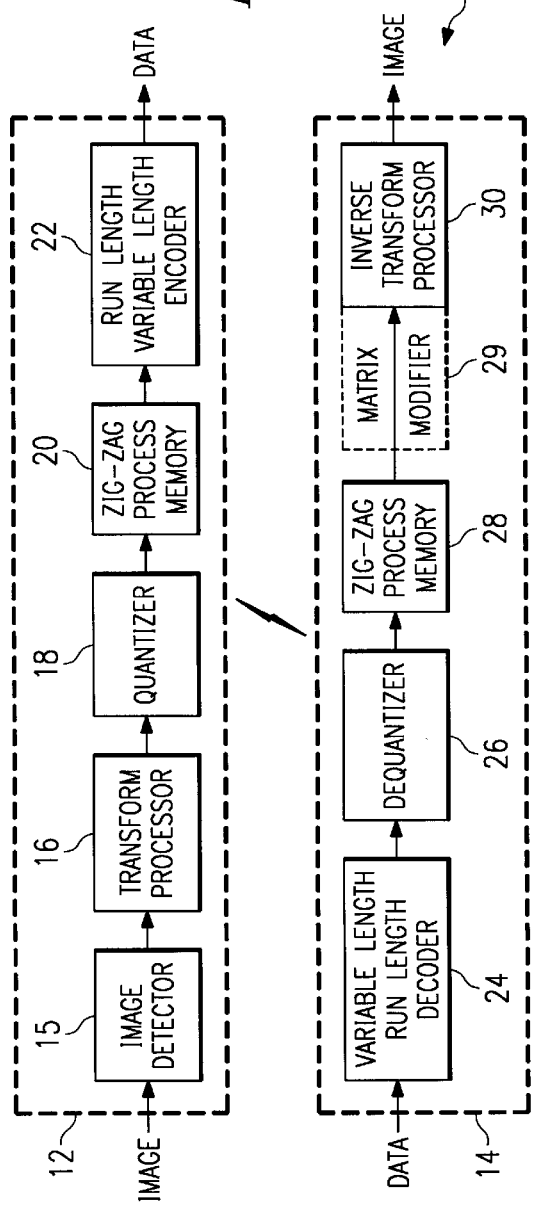
FIG. 1 illustrates a block diagram of an image encoding/decoding system.

FIG. 1 is a block diagram of an image encoder/decoder system 10. Image encoder/decoder system 10 includes an encoder section 12 and a decoder section 14. Encoder section 12 may be co-located with decoder section 14 or encoder section 12 may include a transmitter for transmission of encoded images to a receiver in a remote decoder section 14. Encoder section 12 includes an image detector 15, a transform processor 16, a quantizer 18, a zig-zag process memory 20, and a run/variable length encoder 22. Decoder section 14 includes a variable/run length decoder 24, a dequantizer 26, a zig-zag process memory 28, and an inverse transform processor 30.

Figure 2:
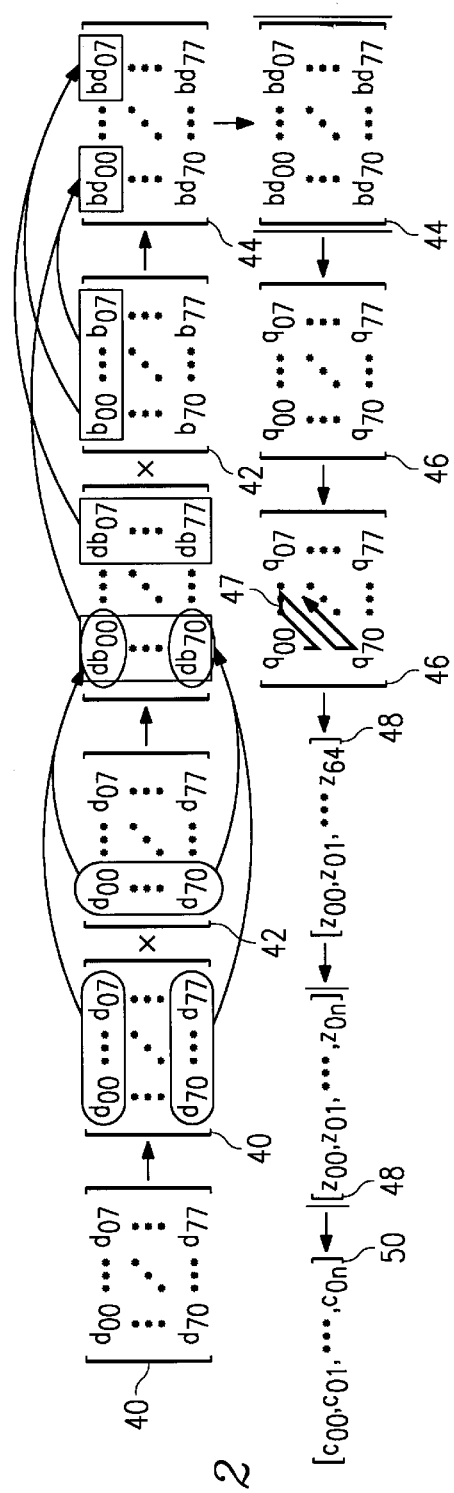
FIG. 2 illustrates a matrix generation technique performed by an encoding section of the image encoding/decoding system.

FIG. 2 shows an operation of encoder section 12. Image detector 15 generates an eight by eight block 40 of image data from a detected image for processing by transform processor 16. Eight by eight block 40 of image data is processed by a transform function in transform processor 16. Transform processor 16 computes a new matrix by performing a conventional sum of products row and column addition and multiplication extrapolation process on the eight by eight block of data with pre-defined basis functions 42. A new matrix 44 generated by transform processor 16 is fed to quantizer 18 that performs a quantization process on the new matrix 44. The quantization process performed by quantizer 18 rounds the data within the new matrix 44 to a desired decimal length. A quantized matrix 46 generated by quantizer 18 is processed by zig-zag process memory 20. Zig-zag process memory 20 extracts each data portion of the quantized matrix 46 by following a pre-defined pattern 47 in order to generate a single row matrix 48. The single row matrix 48 is processed by run/variable length encoder 22 in order to compress the single row matrix 48 for transmission to decoder section 14. Run/variable length encoder 22 generates a compressed matrix 50 that is transmitted to decoder section 14.

Figure 3:
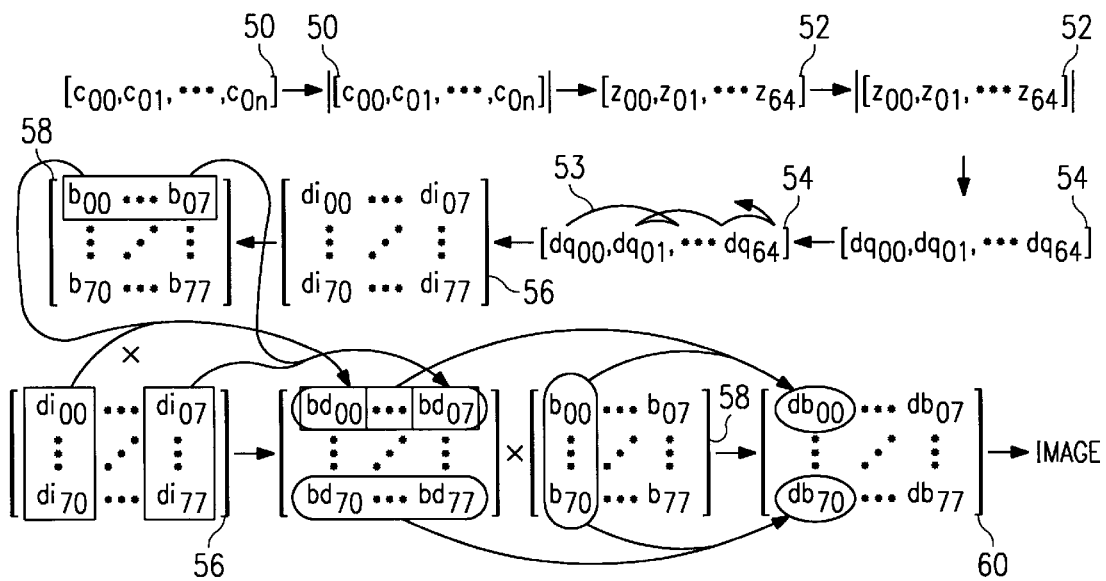
FIG. 3 illustrates a matrix generation technique performed by a decoding section of the image encoding/decoding system.

FIG. 3 shows an operation of decoder section 14. Decoder section 14 performs a similar but opposite processing scheme as compared to encoder section 12. Decoder section 14 receives compressed matrix 50 from encoder section 12 and performs a decompression process on compressed matrix 50 at variable/run length decoder 24. Variable/run length decoder 24 generates a single row matrix 52 that is converted into a dequantized matrix 54 by dequantizer 26. Zig-zag process memory 28 generates a dequantized eight by eight matrix 56 from dequantized matrix 54 by following a pre-defined de-extraction pattern 53. Dequantized eight by eight matrix 56 is processed by inverse transform processor 30. Inverse transform processor 30 performs a column and row addition and multiplication extrapolation process on dequantized eight by eight matrix 56 with pre-defined basis functions 58. Inverse transform function 30 generates an image matrix 60 therefrom for display.

Typically, transform processor 16 and inverse transform processor 30 are based on a discrete cosine transform (DCT) and an inverse discrete transform function (IDCT), respectively. Basis functions for transform processor 16 and inverse transform processor 30 are generated by taking cosines at discretization points of multiples of 11.25 degrees. The discrete cosine transform and basis functions allow for accurate real number representation, placing the bulk of the error in quantizer 18 and dequantizer 26 and requiring the use of high resolution multipliers that increase the cost and the semiconductor area of the encoding and decoding processes. Table 1 shows the basis functions for the discrete cosine transform.

TABLE 1

Basis Functions for DCT

| Time | DCT_0 | DCT_1 | DCT_2 | DCT_3 | DCT_4 | DCT_5 | DCT_6 | DCT_7 |
|---|---|---|---|---|---|---|---|---|
| 0 | 1.0 | 0.981 | 0.924 | 0.8315 | 0.707 | 0.556 | 0.383 | 0.1951 |
| 1 | 1.0 | 0.8315 | 0.383 | −0.1951 | −0.707 | −0.981 | −0.924 | −0.556 |
| 2 | 1.0 | 0.556 | −0.383 | −0.981 | −0.707 | 0.1951 | 0.924 | 0.8315 |
| 3 | 1.0 | 0.1951 | −0.924 | −0.556 | 0.707 | 0.8315 | −0.383 | −0.981 |
| 4 | 1.0 | −0.1951 | −0.924 | −0.556 | 0.707 | −0.8315 | −0.383 | 0.981 |
| 5 | 1.0 | −0.556 | −0.383 | 0.981 | −0.707 | −0.1951 | 0.924 | −0.8315 |
| 6 | 1.0 | −0.8315 | −0.383 | 0.1951 | −0.707 | 0.981 | −0.924 | 0.556 |
| 7 | 1.0 | −0.981 | 0.924 | −0.8315 | 0.707 | −0.556 | 0.383 | −0.1951 |

Figure 4:
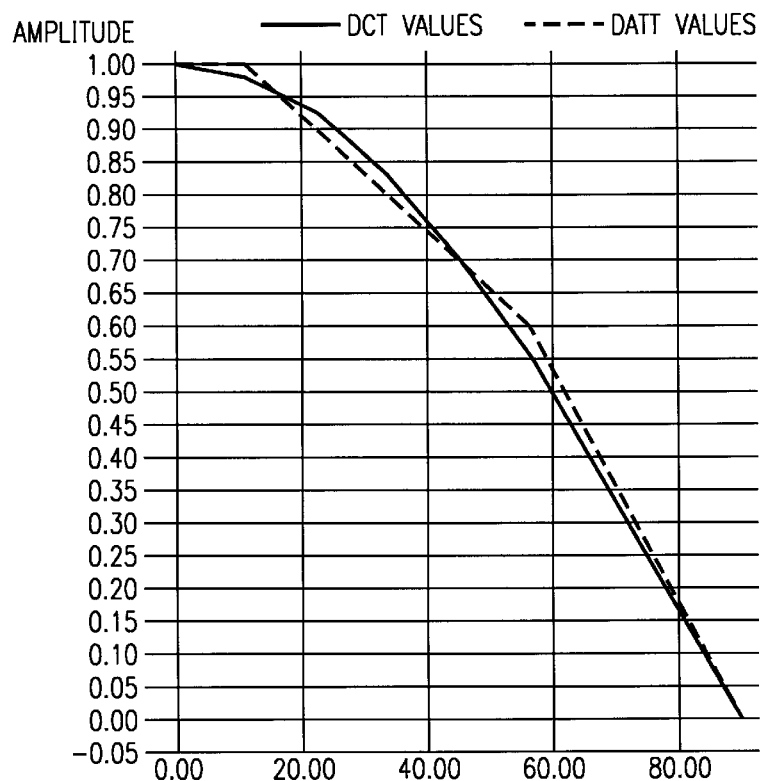
FIG. 4 illustrates a graph of an articulated trapezoidal waveform used by the image encoding/decoding system.

In order to reduce the cost and the die area required by the encoding and decoding processes, an articulated trapezoidal waveform is used to approximate the cosine waveform and provide for easy integer realizability. FIG. 4 shows a graph comparison of a cosine waveform 70 with an articulated trapezoidal waveform 72. The articulated trapezoidal wave-form is the foundation of a discrete articulated trapezoid transform (DATT) for use in encoder section 12 or decoder section 14. The turning points for articulated trapezoidal waveform 72 are chosen based on ease of realizability. The use of the articulated transform spreads out the error in image encoding/decoding system 10 between quantizer 18 and transform processor 22 in encoder section 12 and between dequantizer 26 and inverse transform processor 30 in decoder section 14. The integer realizability of the articulated trapezoid eliminates the need of multipliers as required for the discrete cosine transform. Multiplication can be performed through chained addition of the integer values. Table 2 shows a comparison of the discrete cosine transform with the discrete articulated trapezoid transform at the discretization points.

TABLE 2

Comparison of DCT and DATT

| S N | Angle | DCT | 10*DATT | Error |
|---|---|---|---|---|
| 0 | 0 | 1.00 | 10 | 0.00 |
| 1 | 11.25 | 0.981 | 10 | 0.019 |
| 2 | 22.50 | 0.924 | 9 | −0.024 |
| 3 | 33.75 | 0.8315 | 8 | −0.0315 |
| 4 | 45.00 | 0.707 | 7 | −0.007 |
| 5 | 56.25 | 0.556 | 6 | 0.044 |
| 6 | 67.50 | 0.383 | 4 | 0.017 |
| 7 | 78.75 | 0.195 | 2 | 0.005 |
| 8 | 90.00 | 0.00 | 0 | 0.00 |

Transform processor 16 or inverse transform processor 30 may process matrix data based on the discrete articulated trapezoid transform. Basis functions for the discrete articulated trapezoid transform are generated from the values shown in Table 2. Table 3 shows the basis functions for the discrete articulated trapezoid transform.

TABLE 3

Basis Functions for DATT

| Time | DATT_0 | DATT_1 | DATT_2 | DATT_3 | DATT_4 | DATT_5 | DATT_6 | DATT_7 |
|---|---|---|---|---|---|---|---|---|
| 0 | 10 | 10 | 9 | 8 | 7 | 6 | 4 | 2 |
| 1 | 10 | 8 | 4 | −2 | −7 | −10 | −9 | −6 |
| 2 | 10 | 6 | −4 | −10 | −7 | 2 | 9 | 8 |
| 3 | 10 | 2 | −9 | −6 | 7 | 8 | −4 | −10 |
| 4 | 10 | −2 | −9 | 6 | 7 | −8 | −4 | 10 |
| 5 | 10 | −6 | −4 | 10 | −7 | −2 | 9 | −8 |
| 6 | 10 | −8 | 4 | 2 | −7 | 10 | −9 | 6 |
| 7 | 10 | −10 | 9 | −8 | 7 | −6 | 4 | −2 |

Table 4 shows an error comparison of four sets image data encoded with a discrete cosine transform function and decoded with an inverse discrete cosine transform function versus decoding with an inverse discrete articulated trapezoid transform function. Regenerated images did not show visible errors, with typical errors occurring only at image edges. Continuity of basis functions ensures that no visible errors are generated.

TABLE 4

Error Comparison of IDCT and IDATT

| | dct/idct | | | | dct/idatt | | | |
|---|---|---|---|---|---|---|---|---|
| | Count | MAE | Max | RMS | Count | MAE | Max | RMS |
| image 1 | 162691 | 0.62 | 4 | 0.88 | 187151 | 0.71 | 12 | 1.06 |
| image 2 | 159214 | 0.61 | 4 | 0.86 | 159206 | 0.61 | 7 | 0.89 |
| image 3 | 156788 | 0.6 | 4 | 0.86 | 147274 | 0.56 | 7 | 0.83 |
| image 4 | 148146 | 0.57 | 4 | 0.83 | 258955 | 0.99 | 11 | 1.57 |

In order to further reduce error, modifications can be done to the third order coefficients of the inverse discrete articulated trapezoid transform. When using first order discrete articulated trapezoid transform basis functions, errors occur in the third order discrete cosine transform basis functions. Modifying the coefficients of the third order inverse discrete articulated trapezoid transform will reduce these errors and provide better overall results.

Table 5 shows a result of a unity matrix with a scaling factor of 40 after being processed by a discrete cosine transform and an inverse discrete articulated trapezoid transform. Ideally, this result would show values for only the diagonal coefficients and zeros for all other coefficients. The result shows the error introduced by the inverse discrete articulated trapezoid transform. Though any corrections of the coefficients would be small, modifications to the coefficients would reduce the mean absolute and rms errors in a resulting image. A matrix modifier 29 within decoder section 14 may be used to perform coefficient modifications.

discrete articulated trapezoid transform process performed on image data that can be used for either encoding, decoding, or both. The discrete articulated trapezoid transform provides integer realizability and eliminates the need for multipliers that increase the cost of an encoding/decoding device and consume precious die area.

Thus, it is apparent that there has been provided, in accordance with the present invention, a method of decoding image data that satisfies the advantages set forth above.

TABLE 5

|   |   | dct terms |   |   |   |   |   |   |   |
|---|---|---|---|---|---|---|---|---|---|
|   |   | 0 | 1 | 2 | 3 | 4 | 5 | 6 | 7 |
| d | 0 | 80.000 | 0.000 | 0.000 | 0.000 | 0.000 | 0.000 | 0.000 | 0.000 |
| a | 1 | 0.000 | 40.376 | 0.000 | −0.488 | 0.000 | 1.091 | 0.000 | 1.060 |
| t | 2 | 0.000 | 0.000 | 39.392 | 0.000 | 0.000 | 0.000 | −0.996 | 0.000 |
| t | 3 | 0.000 | −1.091 | 0.000 | 40.376 | 0.000 | −1.060 | 0.000 | 0.488 |
|   | 4 | 0.000 | 0.000 | 0.000 | 0.000 | 39.592 | 0.000 | 0.000 | 0.000 |
|   | 5 | 0.000 | 0.488 | 0.000 | 1.060 | 0.000 | 40.376 | 0.000 | 1.091 |
|   | 6 | 0.000 | 0.000 | 0.996 | 0.000 | 0.000 | 0.000 | 39.392 | 0.000 |
|   | 7 | 0.000 | −1.060 | 0.000 | 1.091 | 0.000 | 0.488 | 0.000 | 40.376 |

To perform the modifications to the coefficients, each row and column of dequantized eight by eight matrix 56 is modified according to the following criteria prior to processing by the inverse discrete articulated trapezoid transform of inverse transform processor 30. Coefficients in each row and column are of the form a0, a1, a2, a3, a4, a5, a6, and a7. The a3, a5, a7, and a6 coefficients are chosen to be modified corresponding to the errors shown in the unity matrix processing results of Table 5. The following equations show the modifications to the a3, a5, a7, and a6 coefficients.

$$a3 = a3 + f31 \times a1$$

$$a5 = a5 + f51 \times a1$$

$$a7 = a7 + f71 \times a1$$

$$a6 = a6 + f62 \times a2$$

The factors f31, f51, f71, and f62 are of the form i/128, where i is allowed to vary. Optimization performed on images through image encoding/decoding system 10 resulted in the following factor values—f31 3/128, f51 =-3/128, f71 =-3/128, and f62 =3/128. After modification of these coefficients is performed, processing is done by inverse transform processor 30. Table 6 shows the error comparison using a modified inverse discrete articulated trapezoid transform.

TABLE 6

Error Comparison of IDCT and Modified IDATT

|  | dct/idct | | | | dct/idattc | | | |
|---|---|---|---|---|---|---|---|---|
|  | Count | MAE | Max | RMS | Count | MAE | Max | RMS |
| image 1 | 162691 | 0.62 | 4 | 0.88 | 154390 | 0.59 | 6 | 0.86 |
| image 2 | 159214 | 0.61 | 4 | 0.86 | 142226 | 0.54 | 4 | 0.80 |
| image 3 | 156788 | 0.6 | 4 | 0.86 | 138165 | 0.53 | 4 | 0.78 |
| image 4 | 148146 | 0.57 | 4 | 0.83 | 175234 | 0.67 | 7 | 1.02 |

In summary, an articulated trapezoidal waveform is used to approximate a cosine waveform in image decoding. The articulated trapezoidal waveform is the foundation of a Although the present invention has been described in detail, it should be understood that various changes, substitutions, and alterations can be made herein. For example, a matrix other than with an eight by eight configuration may be used in the computation of image data. Other examples are readily ascertainable to one skilled in the art and may be made without departing from the spirit and scope of the present invention as defined by the following claims.

What is claimed is:

1. A method of decoding an image, comprising the steps of:
   receiving image data which has been discrete cosine transformed;
   decompressing the image data;
   dequantizing the image data;
   placing the image data into a matrix format;
   applying an inverse discrete articulated trapezoid transform to the matrix format; and
   generating an image from the inverse discrete articulated trapezoid transform application.

2. The method of claim 1, wherein the inverse discrete articulated trapezoid transform includes basis functions with integer realizable coefficients.

3. The method of claim 2, wherein the application of the inverse discrete articulated trapezoid transform includes performing a sum of products extrapolation between the matrix format and the basis functions.

4. The method of claim 2, further comprising the step of:
   modifying third order coefficients of the inverse discrete articulated trapezoid transform to reduce error.

5. The method of claim 2, further comprising the step of:
   modifying selected coefficients of the matrix format to reduce visible error in the image.

6. The method of claim 1, wherein the inverse discrete articulated trapezoid transform is formed in response to an articulated trapezoid waveform that approximates a cosine waveform.

7. An image decoder, comprising:
   a variable/run length decoder operable to receive image data which has been discrete cosine transformed, the variable/run length decoder operable to decompress the image data;
   a dequantizer operable to dequantize the decompressed image data;

a zig-zag process memory operable to generate a matrix format of the dequantized decompressed image data; and an inverse transform processor operable to generate an image from the matrix format, the inverse transform processor applying an inverse discrete articulated trapezoid transform to the matrix format in order to generate the image.

8. The image decoder of claim 7, wherein the inverse discrete articulated trapezoid transform includes basis functions formed by approximating a cosine waveform with an articulated trapezoidal waveform.

9. The image decoder of claim 8, wherein the third order coefficients of the inverse discrete articulated trapezoid transform are modified to reduce error.

10. The image decoder of claim 8, wherein the inverse transform processor performs a sum of products extrapolation between the matrix format and the basis functions.

11. The image decoder of claim 10, wherein the inverse transform processor includes chained adders to perform the sum of products extrapolation.

12. The image decoder of claim 7, wherein the inverse discrete articulated trapezoid transform has integer realizability.

13. The image decoder of claim 7, further comprising:

a matrix modifier operable to modify selected coefficients of the matrix format in order to reduce visible error in the image.

* * * * *

UNITED STATES PATENT AND TRADEMARK OFFICE
CERTIFICATE OF CORRECTION

PATENT NO. : 6,144,768
DATED : November 7, 2000
INVENTOR(S) : Shivaling S. Mahant-Shetti and Whoi Yul Kim It is certified that error appears in the above-identified patent and that said Letters Patent is hereby corrected as shown below:

<u>Title page,</u>
Item [60], insert:
-- [60]    Related U.S. Application Data
Provisional Application No. 60/017,071 filed 04/30/1996. --

Signed and Sealed this

Twenty-fifth Day of February, 2003

JAMES E. ROGAN
*Director of the United States Patent and Trademark Office*